United States Patent

Stieger

Patent Number: 5,122,629
Date of Patent: Jun. 16, 1992

[54] RESISTANCE SEAM WELDING MACHINE

[75] Inventor: Othmar Stieger, Kindhausen, Switzerland

[73] Assignee: Elpatronic AG, Zug, Switzerland

[21] Appl. No.: 571,758

[22] Filed: Aug. 22, 1990

[30] Foreign Application Priority Data

Sep. 20, 1989 [CH] Switzerland ............. 03413/89

[51] Int. Cl.⁵ .................................... B23K 1/16
[52] U.S. Cl. .............................. 219/64; 219/81; 219/84
[58] Field of Search ................... 219/64, 81, 84

[56] References Cited

U.S. PATENT DOCUMENTS 4,051,343  9/1977  Opprecht ..................... 219/84
4,803,323  2/1988  Frei et al. .................... 219/64

Primary Examiner—Marvin M. Lateef
Attorney, Agent, or Firm—McCormick, Paulding & Huber

[57] ABSTRACT

A compact resistance seam welding machine wherein the upper electrode roller (14) is provided on a pivotally mounted arm (12) instead of on a pendulum roller head. The lower electrode roller (16), which is disposed below the upper electrode roller (14), is provided on a rigid lower arm (8) as usual. The pivotal mounting (10) of the arm (12) includes a stack of copper foils (102) on the side adjacent to the lower arm (8) and of a steel strip (101) on the side remote from the lower arm (8). The steel strip (101) and the copper foils (102) are each clamped, on the one side to the machine frame (4) and on the other side to the opposite end of the arm (12). The arm (12) is therefore pivotally mounted on the principle of a parallelogram linkage, while the pivotal mounting (10) serves for the transmission of welding current to the upper electrode roller (14) at the same time. The pivotal mounting (10) only permits the upper electrode roller (14) a vertical movement up and down.

11 Claims, 2 Drawing Sheets

RESISTANCE SEAM WELDING MACHINE

BACKGROUND OF THE INVENTION

The invention relates to a resistance seam welding machine, particularly for the longitudinal seam welding of can bodies, having two electrode rollers arranged one above the other, with a pivotally mounted arm which carries the upper electrode roller and guides it vertically and in the welding direction, and a lower arm which carries the lower electrode roller, and having flexible current leads in the current supply to the upper electrode roller.

In a known resistance seam welding machine of this kind (DE-PS 37 10 875), the pivotally mounted arm which carries and guides the upper electrode roller is constructed in the form of a wishbone from a stirrup and a pendulum arm, each of which is pivotally mounted at one end on the machine frame and which are articulated on one another at the other end, near the upper electrode roller. The pendulum arm has a mounting flange for the upper electrode roller at the other end and is rotatably mounted at the one end in a pendulum roller head by means of rolling bearings. Also secured to this end of the pendulum arm is a toothed rim through which a chain can set the pendulum arm and hence the upper electrode roller in rotation. The pendulum roller head is built on the principle of a counterpoised balance so that its pendulum bearing arrangement carries the whole weight and the upper electrode roller rests on the lower electrode roller practically without any weight. In order to adjust a certain pressure, a spring presses from above on the shaft of the upper electrode roller. The supply line leading from the welding transformer to the upper electrode roller comprises a busbar and the pendulum roller head, which are connected to one another for electrical conduction by flexible current leads. An annular chamber filled with liquid metal is disposed between the pendulum roller head and the pendulum arm for the current transmission. The current leads consist of woven flex, that is to say of limp material which is flexible in any direction because the current leads should hinder as little as possible the free mobility of the pendulum roller head in relation to the busbar.

Although the construction of the arm with the pendulum roller head, as provided in this known resistance seam welding machine, is complicated and expensive, nevertheless in heavy-duty machines it guarantees a satisfactory weld quality, particularly a uniformly satisfactory weld quality over the whole length of the longitudinal seams of can bodies. In simpler resistance seam welding machines which work at lower welding speeds than such heavy-duty machines, it would be an advantage from the point of view of cost if a more simple bearing arrangement could be provided for the upper electrode roller without the quality of the weld being impaired as a result. If the pendulum roller head were simply omitted, the said stirrup would have to be constructed in the manner of the said busbar as a result of which the advantage of the small moving mass in the region of the upper electrode roller and its great vertical mobility would be lost. In addition, resilient current leads would have to be provided which would likewise have to restrict the vertical mobility of the upper electrode roller as little as possible. Avoiding all these problems would require an expensive construction which would cancel out the savings aimed at by omitting the pendulum roller head. Finally, as a result of the absence of the pendulum roller head, the simple possibility for the rotary drive of the upper electrode roller would also cease to exist.

SUMMARY OF THE INVENTION

It is the object of the invention, in a resistance seam welding machine of the kind mentioned at the beginning, to mount the upper electrode roller without the aid of a pendulum roller head so that, with a simple construction, substantially equally satisfactory welding results are achieved as with a pendulum roller head.

According to the invention, this problem is solved in that the arm is pivotally mounted on the principle of a parallelogram linkage by means of the current leads which are composed of thin sheet-metal plates disposed in the welding direction and parallel to the lower arm and which are clamped, in each case, at the one end to the machine frame and at the other end to an end of the arm opposed thereto, and of which at least one of the sheet-metal plates is arranged with spacing from the other sheet-metal plates combined to form a stack.

In the resistance seam welding machine according to the invention, instead of the current leads of flex-like construction as in the known resistance seam welding machine, thin metal sheets are provided which are clamped at both ends to the machine frame and to the arm respectively, in two groups spaced apart. At the same time, at least one of the groups is constructed in the form of a stack of metal sheets in order to be able to conduct the welding current which flows via the arm to the upper electrode roller. The thickness of the stack or the number of metal sheets depends on the necessary current cross-section. Thus according to the invention, the arm which carries the upper electrode roller at one end is provided at the opposite end with a kind of double flexible strip mounting and is thus pivotally mounted on the principle of a parallelogram linkage. Because of this mounting, the arm as a whole is only movable up and down about an imaginary axis which extends transversely to the welding direction. On the other hand, the arm is not movable about its longitudinal axis or the welding direction. The upper electrode roller is therefore only movable up and down in relation to the lower electrode roller, as a result of which any kind of tilting moment is avoided which might have a disadvantageous effect on the weld quality. The construction of the mounting of the arm is simple because, in the resistance seam welding machine according to the invention, the current leads fulfil two functions, namely not only the current transmission function but also a guiding function for the arm. Since the metal plates of the current leads and the arm are arranged one behind the other in the welding direction, there results the defined movement characteristic described above of the upper electrode roller in the vertical plane. Easy mobility of the electrode roller in the vertical plane is afforded because the stroke which the electrode roller has to execute has, as a lower limiting value, roughly the simple thickness of the sheet metal to be welded and as an upper limiting value additionally the wire thickness when a flat wire electrode is used. A flat wire electrode serves the purpose of preventing contamination of the electrode roller by forming a compound with a metal of the work to be welded. Further details about this will be found in the abovementioned DE-PS 37 10 875 and, for example, in DE-PS 35 16 397, both of which originate from the Applicants themselves. The said upper limiting value of the stroke is about two millimeters. With such a small stroke, the double flexible strip mounting of the arm remain torsionally rigid about its longitudinal axis so that parallel guiding of the upper electrode roller is maintained over the whole stroke range.

The arm and its mounting, which is connected at the machine frame side to a line leading from the welding transformer or the like welding source, are arranged parallel to the lower arm and at a relatively short distance from this. The lower arm is part of the return line of the welding current so that, in this, the welding current flows in a direction which is opposite to the direction of the welding current in the arm and its mountings. Because of the short distance apart, unilateral current displacement occurs (also called proximity effect), which results from the superimposition of the magnetic fields of feed and return lines and has the consequence that the lines of current flow in the conductors are concentrated in adjacent regions thereof. Further details about this will be found in "Widerstandsschweissen", Vorträge der 5. Stuttgarter Sondertagung Widerstands-Schweisstechnik 1962, Deutscher Verlag für Schweisstechnik (DVS) GmbH, Düsseldorf 1963, page 49. It is therefore possible in the resistance seam welding machine according to the invention, of the two current leads which form the double flexible strip mounting, to construct only the lower current lead in the form of a thick stack conducting the predominant part of the welding current, whereas the other current lead can be made considerably thinner and, for example, need consist only of at least one metal plate. Nevertheless, with a view to simple stock-keeping and the like for example, there is no reason why both current leads should not be constructed in the form of stacks of thin metal plates, which stacks have the same thickness.

The welding pressure, that is to say the bearing pressure of the upper electrode roller, is fixed from the beginning in the resistance seam welding machine according to the invention by appropriately positioning the clamping points of the arm. The upper electrode roller therefore always exerts the set pressure downwards and also rests with pressure on the lower electrode roller when no material to be welded happens to be between them. When a flat wire electrode is used, the arm is moved upwards by the said upper limiting value of the stroke, by means of a lever or the like, when the flat wire electrode has to be threaded up at the beginning.

Advantageous developments of the invention form the subject of the sub-claims.

The development of the invention according to claim 2 ensures a particularly excellent pivotal mounting for the arm since this has a current-conducting stack of thin copper sheets only on the side adjacent to the lower arm whereas the side remote from the lower arm consists only of a spring steel strip. As already explained above, this is permissible because only a very minor proportion of the welding current flows on the side remote from the lower arm. The combination of a stack of thin copper sheets on the one hand and a thin steel strip on the other hand renders possible a transmission of the welding current without loss with the best mechanical properties and a more economical construction of the mounting at the same time.

From this point of view, the development of the invention according to claim 5 offers the greatest advantages when the stack conducting the current is composed of copper foils and the other flexible strip of the mounting is composed of a spring steel strip.

In the development of the invention according to claim 5, the pivotal mounting of the arm is connected directly to a busbar of the current supply which results in the shortest connection to the upper electrode roller. The free length (measured in the welding direction) of the metal plates of the pivotal mounting or their clear width is predetermined by the materials selected and the necessary vertical stroke of the upper electrode roller. The length of the arm between the upper electrode roller and the pivotal mounting is kept as short as possible in order to avoid unnecessary moving masses. At the same time, there cannot be a drop below a certain minimum length because there must usually still be room for an idler roller preceding the electrode roller if a flat wire electrode is used.

Even when the busbar extends transversely to the lower arm in the space inside the pivotal mounting of the arm, in the development of the invention according to claim 6, its vertical mobility is not hampered because the busbar is relieved in this region to such an extent that there is sufficient spacing from the adjacent metal plates of the pivotal mounting.

In the development of the invention according to claim 7, the metal plates of the pivotal mounting are simply bolted to the busbar and the arm as is usually the case in flexible strip mountings.

The moving mass of the arm is further reduced by the construction in the form of a fork-shaped block in the development of the invention according to claim 8.

The telescopic leg provided in the development of the invention according to claim 9 does not have any guiding function but serves only for the adjustable fixing of the welding pressure.

Because of the absence of the pendulum roller head, another driving possibility must be provided for the upper electrode roller. In the development of the invention according to claim 10, this drive is effected simply by the flat wire electrode which is driven elsewhere in the resistance seam welding machine. The same driving possibility can be provided for the lower electrode roller.

In tests carried out, it has been found that the copper foils with thicknesses in the range from 7/100 to 15/100 millimeters used in the development of the invention according to claim 11 produce satisfactory results. In this case, either two stacks of copper foils or one stack of copper foils in combination with a steel strip may be used as a pivotal mounting for the arm.

BRIEF DESCRIPTION OF THE DRAWINGS

Examples of embodiment of the invention are described in more detail below with reference to the drawings.

DESCRIPTION OF THE PREFERRED EMBODIMENTS

Figure 1:
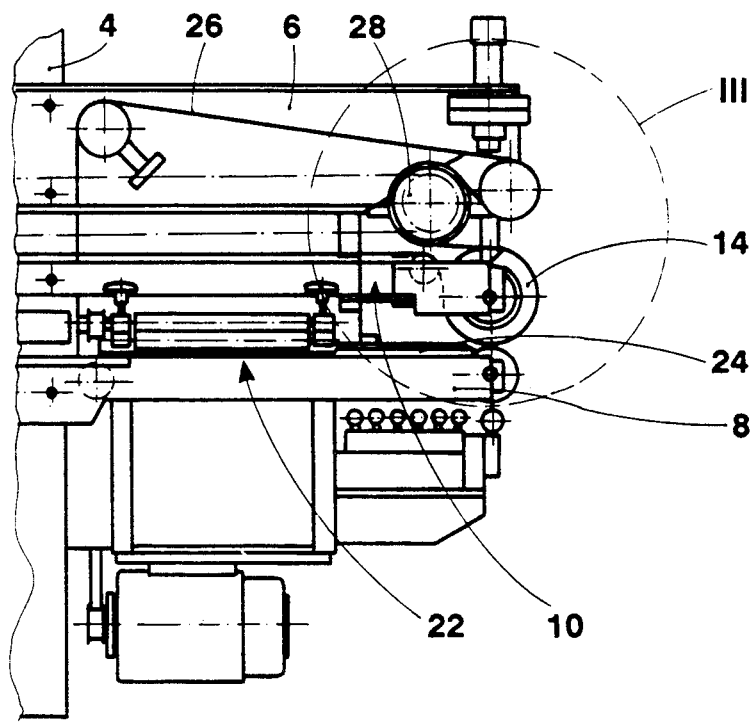
FIG. 1 shows a partial side view of the resistance seam welding machine according to the invention.
Figure 2:
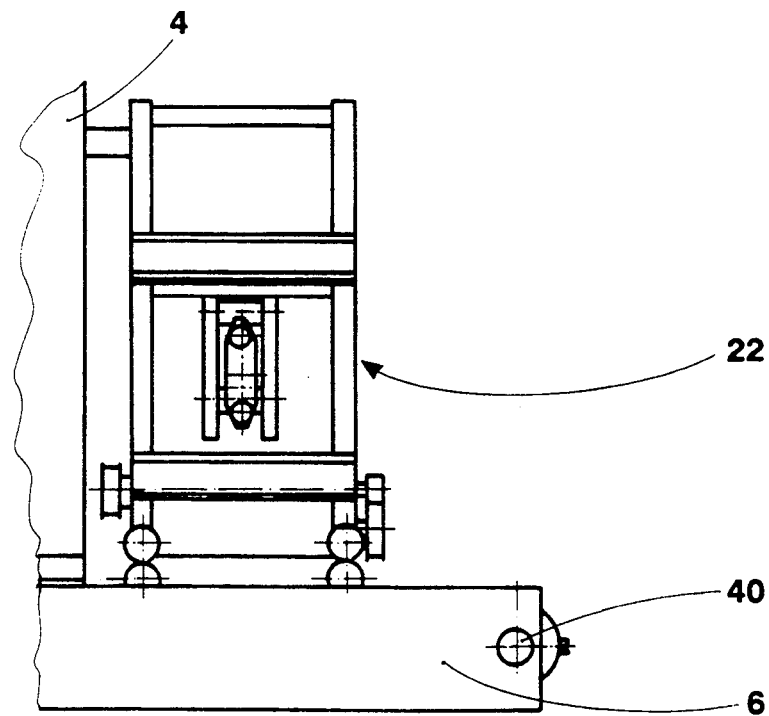
FIG. 2 shows the resistance seam welding machine in a partial view from above.
Figure 3:
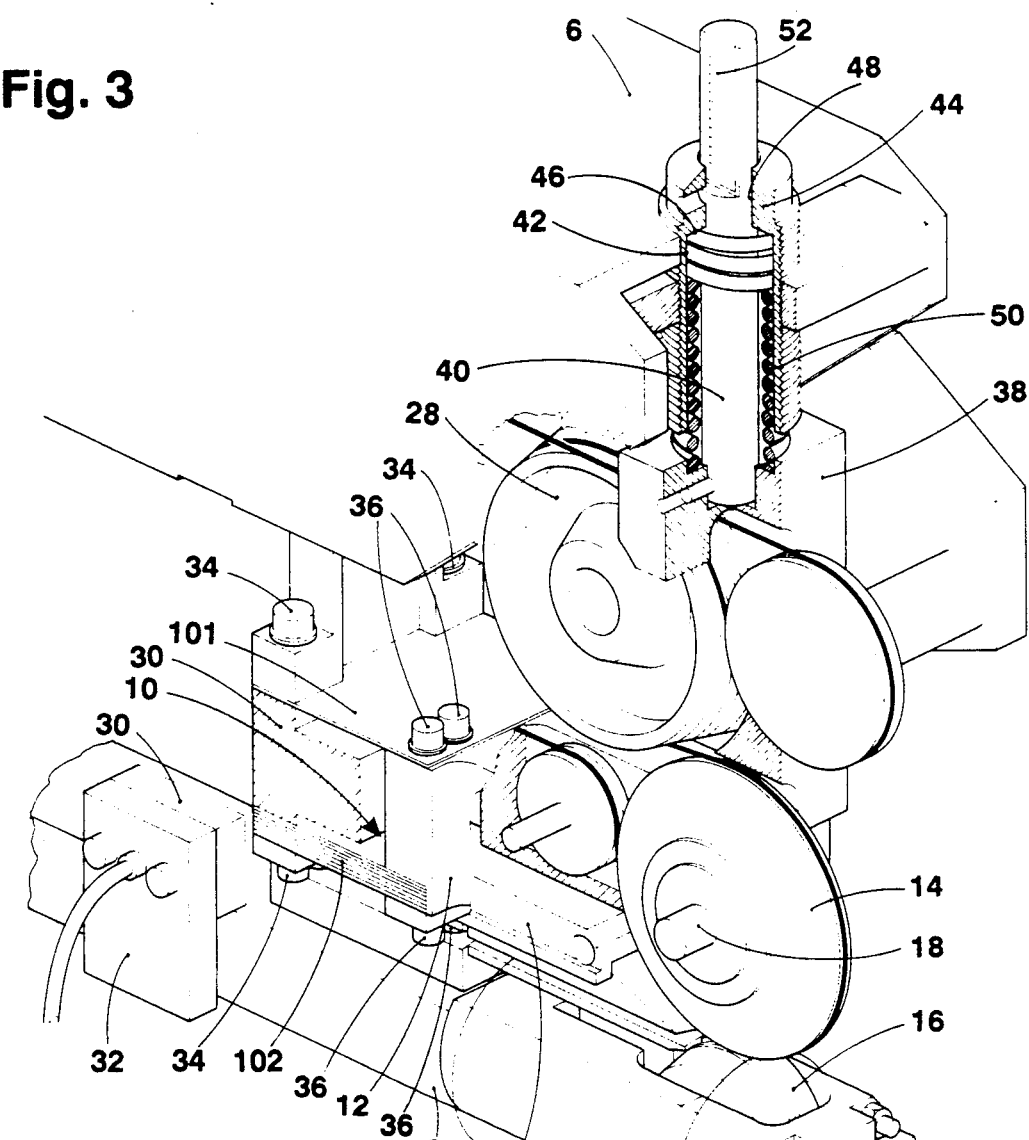
FIG. 3 shows the detail III from FIG. 1 illustrated on a larger scale.

FIG. 1 shows, in a partial side view, the upper and lower arm region of a resistance seam welding machine for welding can bodies 2 (see FIG. 3). FIG. 2 shows the same region of the resistance seam welding machine in a partial plan view. An upper arm 6 and a lower arm 8 are secured to a machine frame 4 parallel to one another and with vertical spacing from one another. An arm 12 disposed between the upper arm 6 and the lower arm 8 is pivotally mounted by one end on the machine frame 4 and carries an upper electrode roller 14 at its free end. The lower arm carries a lower electrode roller 16 at its free end. The electrode rollers 14,16 are arranged vertically one above the other and are freely rotatable on shafts 18 and 20 which are secured to the upper and lower arms respectively. The pivotal mounting of the arm 12, which is designated as a whole by 10, is described in more detail below. The pivotal mounting 10 and the arm 12 are arranged one behind the other in the welding direction which is a direction parallel to the longitudinal axis of the lower arm 8. The pivotal mounting 10 is so constructed, in a manner likewise described in more detail below, that the arm 12 guides the electrode roller 14 vertically and in the welding direction, so that the upper electrode roller 14 can only execute movements in the vertical plane containing the welding direction and its median cross-sectional plane. The lower arm 8 is rigid so that the lower electrode roller is merely rotatable about its shaft 20.

The resistance seam welding machine illustrated in the drawings is a very compactly built machine wherein the metal sheets for the can bodies 2 to be longitudinally seam welded are supplied, immediately before the welding position, to a rounding station 22 which brings them into a cylindrical shape. By means of a Z-rail 24, the edges of the bodies are brought into the correct position relative to each other at the place where the longitudinal seam is to be produced and are introduced, in this state, between the upper electrode roller 14 and the lower electrode roller 16 by means of a conveyor not illustrated in the drawings, for the longitudinal seam welding.

In the resistance seam welding machine illustrated, a flat wire electrode 26 is guided round the upper electrode roller 14 in the manner illustrated in FIGS. 1 and 3 and is driven by a driving pulley 28 with which there is associated a driving device not illustrated. A flat wire electrode is usually likewise guided round the lower electrode roller 16 but this has not been illustrated for the sake of clarity since the guiding of the wire electrode is the subject of another patent application of the Applicants and does not need any more detailed description for an understanding of the invention described here.

Figure 4:
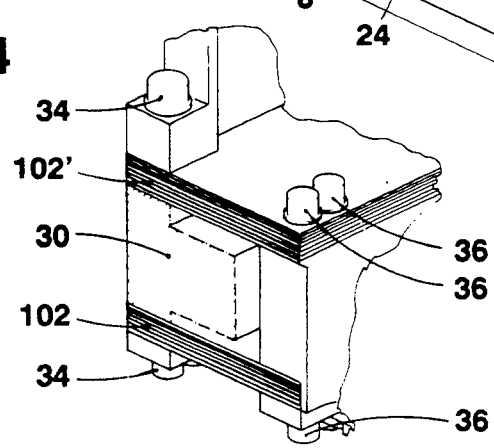
FIG. 4 is a partial illustration of another form of embodiment of a pivotal mounting.

The arm 12 is a block which is forked in cross-section and to the free end of which there is secured the shaft 18 on which the upper electrode roller 14 is rotatable. The arm 12 consists of a material which is a good electrical conductor. In the example of embodiment illustrated, the pivotal mounting 10 of the arm 12 consists of a thin sheet-metal plate 101 of spring steel, that is to say a steel strip, and of a stack of further thin sheet-metal plates 102 which here consist of copper foil in each case. All the thin sheet-metal plates 101,102 are arranged parallel to the lower arm and also one above the other in the direction transverse to the lower arm. The thin sheet-metal plates form not only the pivotal mounting 10 for the arm 12 but also current leads via which the welding current is supplied to the upper electrode roller 14. For the reasons of current distribution explained at the beginning, it is sufficient to produce only the lower current lead from metal sheets which are good electrical conductors since the welding current will flow mainly there. The upper sheet-metal plate 101, on the other hand, may be made of spring steel because scarcely any welding current will flow across it. The steel strip 101 and the stack of copper foils 102 are each clamped at the one end to the machine frame 4 and at the other end to the opposite end of the arm 12. The end of a busbar 30 which is rectangular in cross-section and which leads from the welding transformer extends transversely to the welding direction between the steel strip 101 and the stack of copper foils. The connection of the busbar to the unillustrated welding transformer is merely indicated by a busbar portion 32. The busbar 30 is constructed in the form of a solid copper block in which tapped holes are formed into which bolts 34 are screwed in order to clamp the spring strip and the stack of copper foils to the busbar 30 and therefore to the machine frame in the manner illustrated. The arm 12, which is constructed in the form of a forked block, has in the end opposed to the busbar 30 a continuous solid web in which tapped holes are likewise provided which receive corresponding bolts 36. In this manner, the arm 12 is pivotally mounted by means of the current leads 101,102 on the principle of a parallelogram linkage. The busbar 30, which extends transversely to the welding direction through a space which is formed by the machine frame 4, the end of the arm opposite this and the sheet-metal plates 101,102, occupies this space with a clearance from the adjacent sheet-metal plates outside its clamping points so that the busbar 30 does not impair the pivotal mobility of the arm 12. A further stack of copper foils 102′ could also be provided instead of the steel strip 101 (see FIG. 4).

The pivotal mounting 10 could also be clamped directly to the machine frame 4 instead of to the busbar 30 and be connected to the busbar 30 through an additional electrical connection. A more compact form of construction results, however, in the form of embodiment illustrated.

In an example of embodiment which was tested, the thickness of the copper foils was 7/100 mm. Tests have shown that a thickness of 15/100 mm is also suitable. Values lying in between or smaller or higher values may be selected depending on the current strength and the geometrical conditions in the resistance seam welding machine.

The lower electrode arm 8 is rigid and consists of a material which is a good electrical conductor. Each electrode roller has a stator which is connected to its shaft 18 or 20 respectively and round which there is arranged a rotor. An annular gap, which is filled with liquid metal for the current transmission, is provided between stator and rotor. In addition to this, the electrode rollers are cooled in the interior in the usual manner.

Disposed at the free end of the arm 12 is a forked bracket 38 in the top of which there is inserted a pin 40 which projects with its other end out of the upper arm 6. A shouldered bush 44 provided with an external thread is screwed into a tapped hole 42 in the upper arm 6. Its shoulder 46 surrounds a bore 48 through which the pin 40 extends. A spring 50 is held between the top on the shoulder 46 and at the bottom on the bracket 38 and exerts pressure on the free end of the arm 12 and hence on the upper electrode roller 14. The pressure of the spring 50 can be adjusted in the desired manner by screwing the shouldered bush 44 more or less far into the upper arm 6, while the spring pressure can be read off by means of a scale 52 provided at the upper end of the pin 40. Thus a kind of telescopic leg, via the stroke length of which the welding pressure is adjustable, is formed between the arm 12 and the upper arm 6.

In operation, the welding current flows from the welding transformer via the busbar 30 and the current leads 101,102 to the arm 12 and from this to the upper electrode roller 14. From this, the welding current flows during the welding via the can body 2 to the lower electrode roller 16 and from this, via the lower arm 8, back to the welding transformer. Thus the pivotal mounting 10 forms a kind of double flexible strip mounting for the pivotal support of the arm 12 and at the same time serves for the transmission of the welding current. The pivotal mounting 10 only permits the upper electrode roller 14 a vertical upward and downward movement. The construction described renders it possible to avoid an expensive pendulum roller head and to make the resistance seam welding machine compact in construction without loss of satisfactory guidance of the upper electrode roller 14 vertically and in the welding direction.

I claim:

1. A resistance seam welding machine, particularly for the longitudinal seam welding of can bodies, having two electrode rollers arranged one above the other, with a pivotally mounted arm which carries the upper electrode roller and guides it vertically and in the welding direction, and a lower arm which carries the lower electrode roller, and having flexible current leads in the current supply to the upper electrode roller, wherein the improvement comprising the pivotally mounted arm is pivotally mounted in the manner of a parallelogram linkage by means of the current leads which are composed of a plurality of thin sheet-metal plates which are disposed in the welding direction and parallel to the lower arm, and are clamped, in each case, at one end to the machine frame and at the other end to an end of the arm opposed thereto, and of which at least one sheet-metal plate is arranged in spaced relationship from other of the sheet-metal plates, said other plates being combined to form a stack.

2. A resistance seam welding machine according to claim 1, wherein said at least one sheet-metal plate is disposed to that side of the stack remote from the lower arm and is made of spring steel, and that the sheet-metal plates the stack are each made of copper.

3. A resistance seam welding machine according to claim 1, wherein the sheet-metal plates are combined to form two stacks arranged spaced apart from one another.

4. A resistance seam welding machine according to claim 1, characterized in that the sheet-metal plates of each stack consist of copper foil.

5. A resistance seam welding machine according to claim 1, characterized in that a busbar of the current supply is clamped, between the sheet-metal plates, to the pivotal mounting adjacent to the machine frame.

6. A resistance seam welding machine according to claim 5, characterized wherein the busbar extends transversely to the welding direction through a space which is formed by the machine frame, the end of the arm opposed to this, and the sheet-metal plates and is at a clearance from the adjacent sheet-metal plates outside its clamping points in this space.

7. A resistance seam welding machine according to claim 5, characterized wherein the busbar and the end of the arm opposed to it have, in the side adjacent to the lower arm and in the side remote from the lower arm, tapped holes which receive bolts for clamping the sheet-metal plates.

8. A resistance seam welding machine according to claim 1, characterized in that the arm is a block which is forked in cross-section and on the free end of which the upper electrode roller (14) is rotatably mounted.

9. A resistance seam welding machine according to claim 1, characterized in that the arm and the machine frame is a kind of telescopic leg containing a spring which acts on the free end of the arm and is supported, on the one side on the machine frame and on the other side on the arm, and the force of which is adjustable to adjust the welding pressure via the length of stroke of the telescopic leg.

10. A resistance seam welding machine according to claim 1, with a flat wire electrode taken over each electrode roller, characterized in that at least the upper electrode roller can be driven by the flat wire electrode.

11. A resistance seam welding machine according to claim 4, characterized wherein the thickness of the copper foil has a value in the range from 7/100 to 15/100 millimeters.

* * * * *